Aug. 8, 1961 L. J. STRATTON ET AL 2,995,696
ALTERNATING CURRENT GENERATING SYSTEM
Filed Oct. 6, 1958 7 Sheets-Sheet 1

INVENTORS
KEITH M. CHIRGWIN &
LAWRENCE J. STRATTON
BY Bosworth, Sessions,
Herrström & Knowles
ATTORNEYS

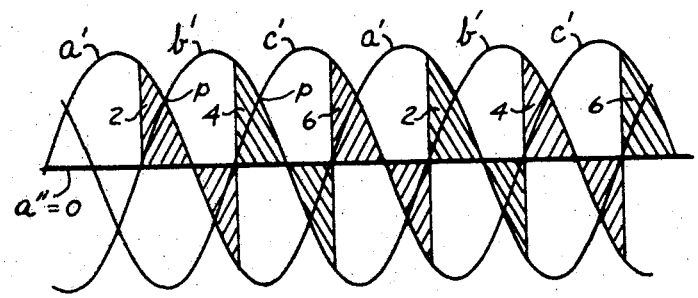
FIG. 3
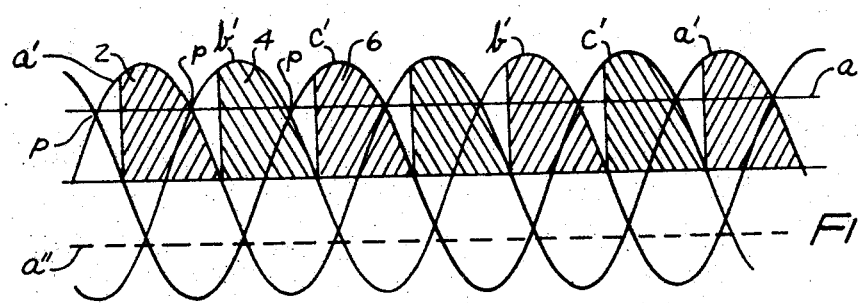
FIG. 4
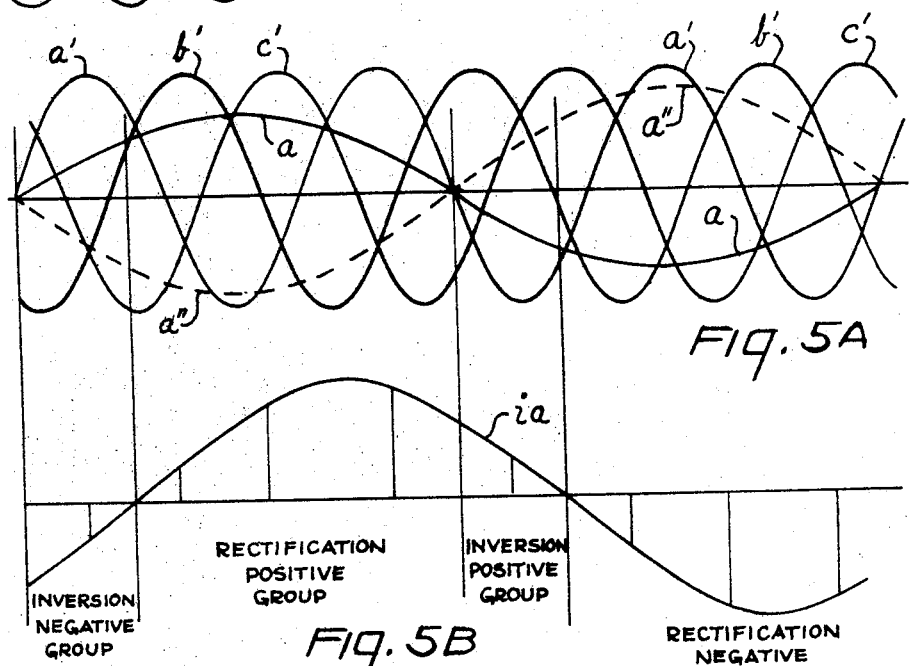
FIG. 5A
FIG. 5B

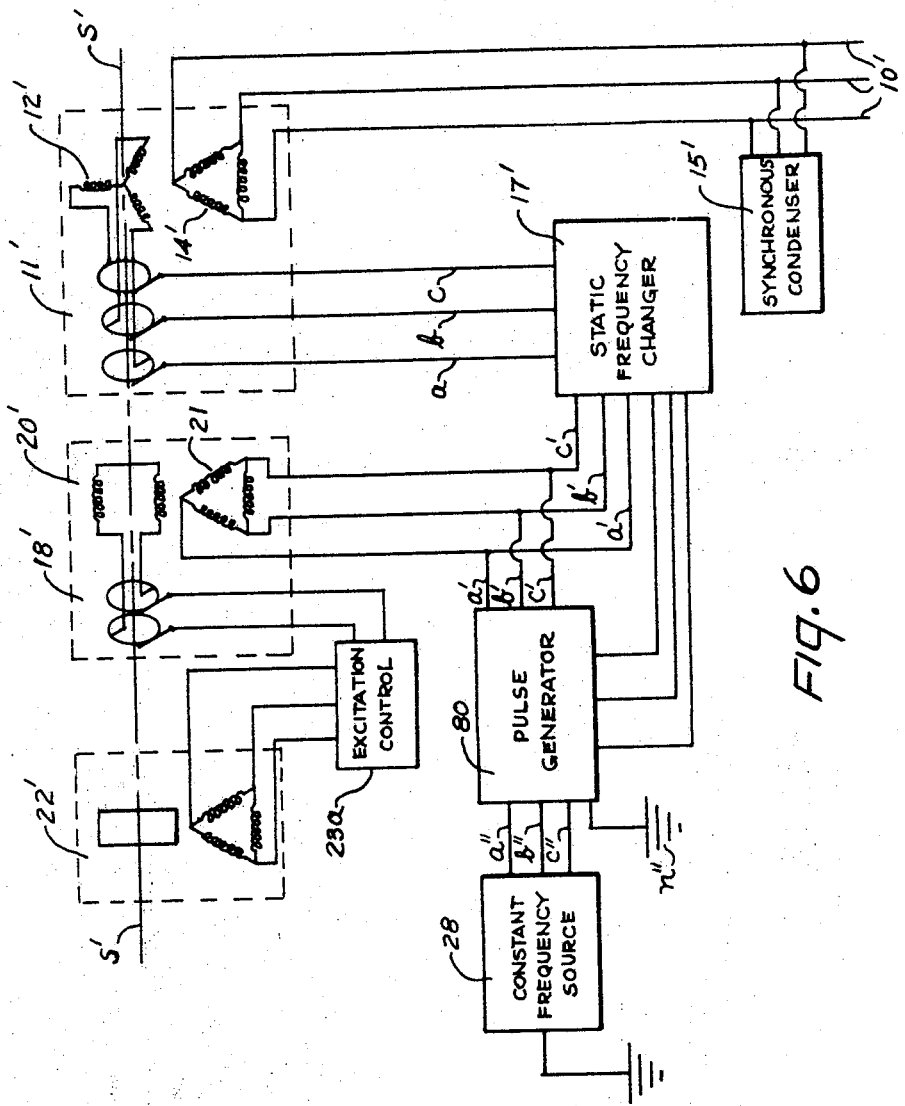

Aug. 8, 1961    L. J. STRATTON ET AL    2,995,696
ALTERNATING CURRENT GENERATING SYSTEM
Filed Oct. 6, 1958    7 Sheets-Sheet 7
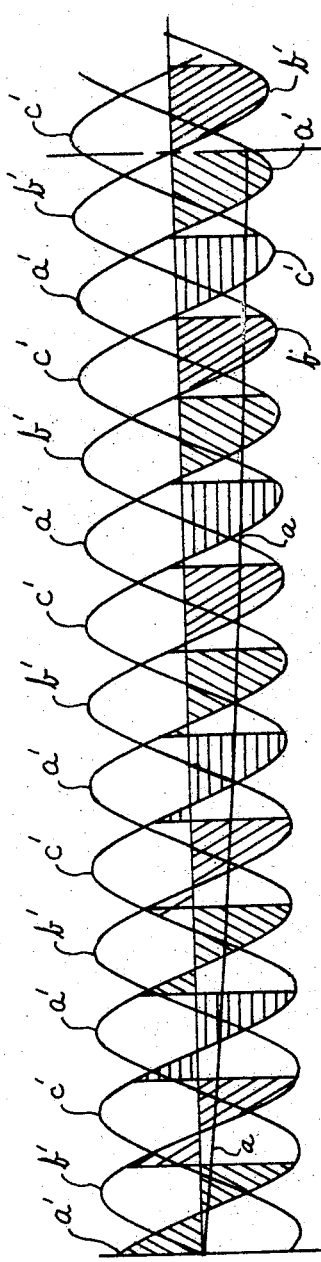
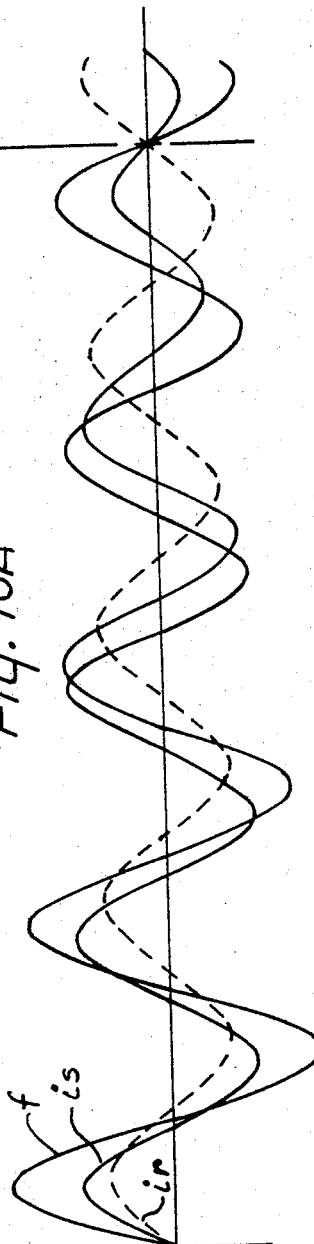
INVENTORS
KEITH M. CHIRGWIN &
BY LAWRENCE J. STRATTON
ATTORNEYS United States Patent Office 2,995,696
Patented Aug. 8, 1961

2,995,696
ALTERNATING CURRENT GENERATING SYSTEM
Lawrence J. Stratton, Lyndhurst, and Keith M. Chirgwin, Bedford Heights, Ohio, assignors, by mesne assignments, to The Siegler Corporation, Los Angeles, Calif., a corporation of Delaware
Filed Oct. 6, 1958, Ser. No. 765,472
25 Claims. (Cl. 322—32)

This invention relates to the generation of alternating current and more particularly to a system for generating alternating current of substantially constant frequency regardless of comparatively wide variations in the speed of the prime mover that drives the alternating current dynamoelectric machine.

It has long been known that the frequency of the output of an induction generator can be controlled either by controlling the speed of the shaft driving the generator or by controlling the frequency and phase relationship of the exciting windings of the generator. At the present time in A.C. systems for aircraft and missiles, a constant speed drive mechanism is employed in conjunction with a synchronous alternator. This is unsatisfactory because of the weight and cost of the constant speed drive and the difficulty of maintenance. Furthermore, constant speed drives do not respond rapidly enough to hold the output frequency of the machine within the tolerances that are often required. It has been proposed to control the excitation of asynchronous generators to produce outputs of substantially constant frequency, but the previous systems have not been adapted for services such as aircraft or missiles because of defects such as insufficient speed range that can be tolerated in the prime mover, the requirement of a large synchronous A.C. system into which the asynchronous generator output can be tied, the necessity of using commutator machines that are required to handle power, and other like difficulties.

A general object of the present invention, therefore, is the provision of a variable speed constant frequency generating system in which the difficulties with prior systems are eliminated and which is particularly adapted to severe service requirements such as are encountered in aircraft and missiles. Another object is the provision of such a system in which it is not necessary to tie the generator into an existing constant frequency system, which does not require a commutator machine for the handling of any substantial amount of power and which will operate with efficiency of a reasonably high order above, below and at synchronous speed.

In machines of the induction type, if the excited windings, which are ordinarily the rotor windings, are excited with D.C., the desired output frequency is produced at one particular shaft speed. This is referred to herein as "synchronous speed." For example, in a four pole aircraft generator with an output frequency of 400 cycles, synchronous speed is 12,000 r.p.m. The output frequency of the machine with D.C. excitation is hereinafter referred to as "shaft frequency." Shaft frequency is equal to the desired output frequency when the shaft is driven at synchronous speed.

At synchronous speed with D.C. excitation, the field rotates at the same speed as the rotor; i.e., the field and the rotor both rotate at synchronous speed and the field is stationary with respect to the exciting windings. If, however, the excitation is by polyphase alternating current, the field can be made to rotate with respect to the exciting windings carried by the rotor so that the field will rotate with respect to the stator at a speed either greater than the rotor speed or less than the rotor speed. By proper control of the excitation frequency, the field can be made to rotate with respect to the rotor at such a speed that the field will rotate at the desired synchronous speed, even though the rotor is not rotating at synchronous speed. Whenever the field rotates at synchronous speed, the generator output will be of the desired frequency. When the rotor is operated at speeds below synchronous speed, the rotor field rotates with respect to the rotor in a direction such that its speed of rotation is added to the rotor speed to bring the speed of the field up to synchronous speed. Conversely, when the rotor is operated above synchronous speed, the excitation of the rotor is such that the rotor field rotates with respect to the rotor in a direction so that the speed of rotation of the field is subtracted from the speed of rotation of the rotor to bring the speed of the field down to synchronous speed. Those skilled in the art will recognize that the apparatus can be made with the exciting windings on the stator and the output windings on the rotor, in which case the field is made to rotate with respect to the stator at slip frequency so that the relative rotation between the rotor (which carries the output windings) and the field will be at synchronous speed. This type of machine is less desirable, however, because the output must be through slip rings.

The direction of rotation of the field which is required when the rotor is driven below synchronous speed is called "positive" hereinafter, and the direction required when the rotor is driven above synchronous speed is called "negative" hereinafter. The frequency required to produce the desired rotation of the field with respect to the rotor is equal to the difference between shaft frequency and the desired output frequency and is hereinafter called "slip frequency." When the rotor is operating precisely at synchronous speed, the slip frequency is zero and the excitation is direct current; the term "slip frequency" as used herein includes this condition. When positive rotation of the rotor field is required, and also at synchronous speed of the rotor, excitation power must be supplied to the rotor from some external source. When negative rotation of the rotor field is required, power is generated in the rotor windings and must be absorbed externally of the rotor. The basic principles are all well known. The present invention provides a practical system utilizing the basic principles to produce a reliable generating system that can be employed to provide alternating current of closely regulated frequency with reasonable efficiency of operation of the machine regardless of wide variations in the shaft speed of the machine.

Preferred forms of the invention are shown in the drawings in which:

FIGURE 1 diagrammatically illustrates one preferred form of generating system embodying our invention.

FIGURES 3, 4, 5A and 5B are diagrams illustrating the operation of the static frequency changer and pulse generator of FIGURE 2.

FIGURE 6 diagrammatically illustrates another preferred form of system embodying the invention.

Figure 7:
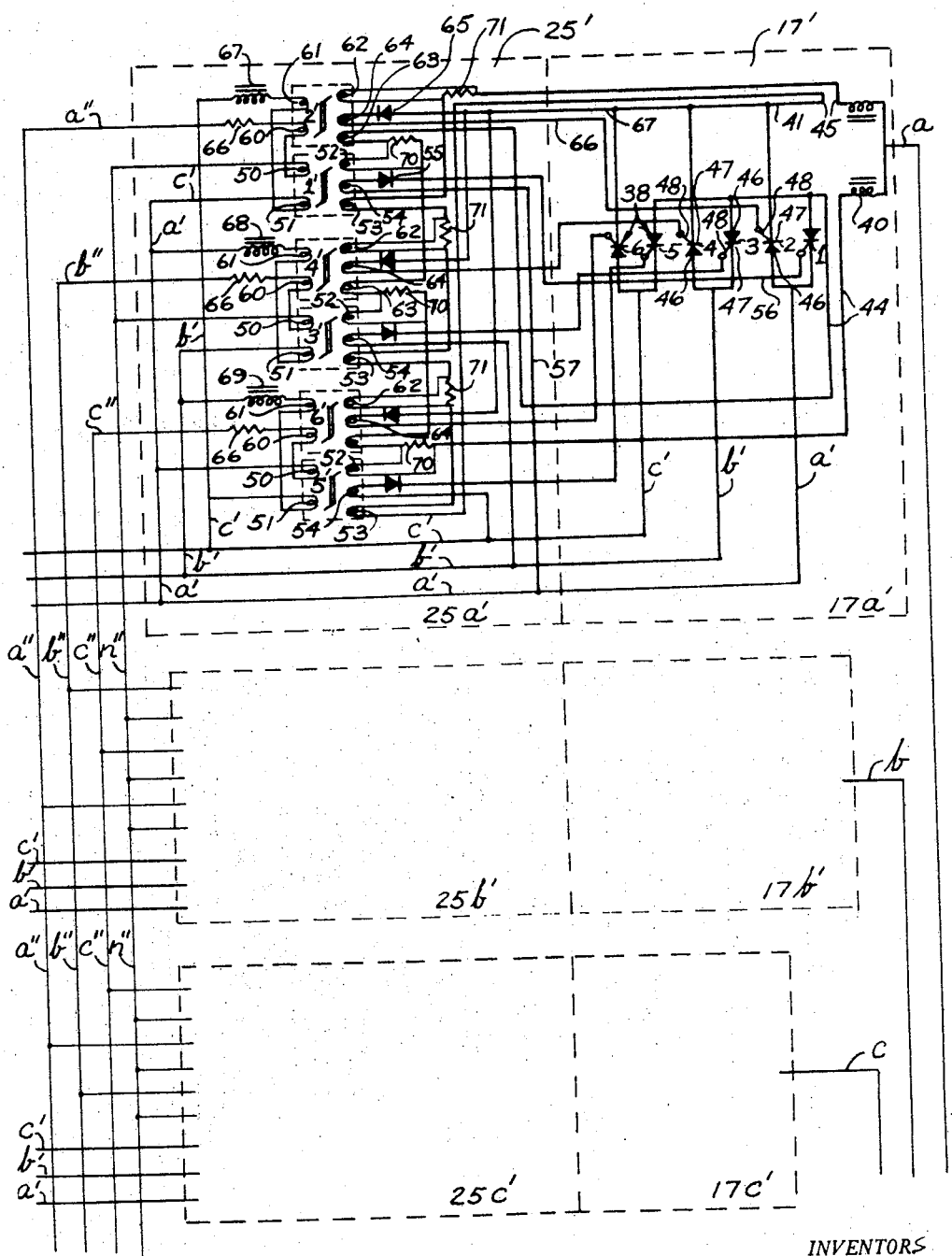

FIGURE 7 is a wiring diagram illustarting a preferred form of static frequency changer and a preferred form of pulse generator for use in the system shown in FIGURE 6, and FIGURES 8A, 8B, 9A, 9B, 10A and 10B are diagrams illustrating the operation of the static frequency changer and pulse generator of FIGURE 7.

Figure 1:
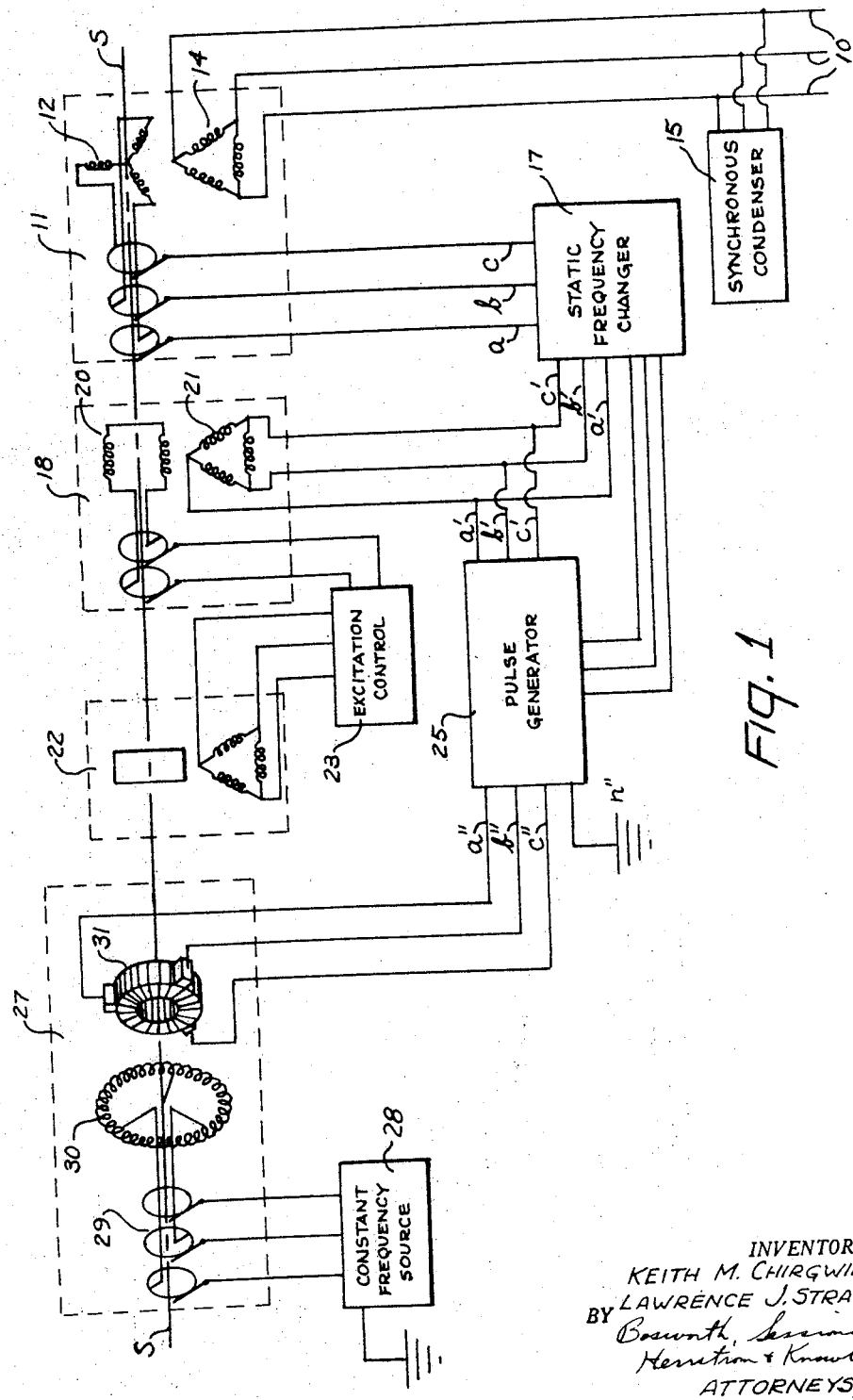

A generating system made according to one preferred form of the invention is shown in FIGURE 1 of the drawings. As indicated in that figure, all of the rotating components of the machine are mounted on a shaft S which is arranged to be driven at variable speeds by a prime mover not shown. The system is designed to supply three phase alternating current of substantially constant frequency to the bus bars 10 regardless of rather wide variations in the speed of the shaft S. For example, the system may be designed to generate 400 cycle A.C. within a frequency tolerance of ±¼ cycle per second throughout a shaft speed range of 6,000 r.p.m. to 15,000 r.p.m., with synchronous speed being 12,000 r.p.m.

The main rotating machine of the system is an induction generator indicated in general at 11. This is a non-salient pole machine shown as having three phase rotating exciting windings 12 and three phase stationary output windings 14 that are connected to the buses 10. If desired, a synchronous condenser 15 may be connected to the buses 10 to balance the voltages between the phases when the load is unbalanced, to smooth out the output wave, to improve the power factor of the induction generator 11 and to provide excitation therefor.

The exciting windings 12 of the rotor are supplied through slip rings with slip frequency excitation current by means of a static frequency changer 17, which is described below. Depending upon the system requirements, the excitation current may be A.C. of such phase relationship that positive rotation of the field is produced, may be D.C., or may be A.C. of such phase relationship that negative rotation of the rotor field is produced, in which case the flow of power is from the rotor windings through the slip rings to the static frequency changer. The three phases of the slip frequency supply are designated $a$, $b$ and $c$ in the drawings. The static frequency changer is supplied by a synchronous exciter indicated in general at 18 and having a rotor 20 and stator 21. This machine acts as a generator or a motor, depending on the direction of transfer of power and is preferably designed to operate at a frequency that is two to three times the highest slip frequency that is required by the exciting windings 12 to maintain the output frequency of the main generator constant within the designed speed range. The output frequency of the exciter is hereinafter referred to as the high frequency supply because of the requirement that it be high with respect to the slip frequency. Actually, the high frequency may be equal to shaft frequency, but in this form of the invention it is preferably two or three times shaft frequency in order to give a wider range of operating speeds with reasonably good wave form. The three phases of the high frequency supply are designated $a'$, $b'$ and $c'$. Excitation for the rotor 20 of the synchronous exciter 18 is supplied by a permanent magnet generator 22 through a static rectifier and excitation control shown at 23. Control 23 may be of any conventional type, including, for example, silicon or selenium rectifiers and other appropriate components to control the excitation of the exciter 18, and will not be described further herein.

The static frequency changer 17 is controlled to provide the proper slip frequency excitation of the rotor 12 by means of a pulse generator 25 which is described in detail below. Pulse generator 25 receives slip frequency signals from a commutator frequency changer 27. This machine derives the slip frequency signal current from a constant frequency source having an output frequency equal to the desired output frequency of the main generator and may be of a well-known type. It is supplied with A.C. of the desired output frequency (in this instance, 400 cycles) from a constant reference frequency source 28, which may be of any conventional construction such as a tuning fork controlled oscillator or generator, through the slip rings 29 to the rotor winding 30. The rotor winding is connected at many points to the segments of commutator 31, the connections being omitted for convenience in the drawing. There is no stator winding in this type of machine; the rotor has the same number of poles as the main induction generator 11. The rotation of the commutator at the variable shaft speed results in the production of a slip frequency signal. Inasmuch as this is simply a control signal, the machine has substantially no power output and the problems of commutation are of no great consequence. The three phases of the slip frequency signal are designated $a''$, $b''$ and $c''$.

The slip frequency signal produced by the slip frequency generator 27 and the high frequency output of the synchronous exciter 18 are utilized in the pulse generator 25 to produce signal pulses that control the static frequency changer 17 to cause it to convert the high frequency supply to slip frequency current of the proper phase and frequency to supply the rotor winding 12 with the excitation required to produce the required constant frequency output in the stator 14 of the main generator 11. Again, it is to be noted that at synchronous speed the output of the static frequency changer is D.C. At speeds below synchronous, power is supplied by the exciter 18 and static frequency changer 17 to the rotor 12. At speeds above synchronous speed, power is supplied by the rotor 12 through the static frequency changer 17 to the synchronous exciter 18 and power is thus put back into the shaft S; the exciter 18 operates as a synchronous motor under these conditions.

Figure 2:
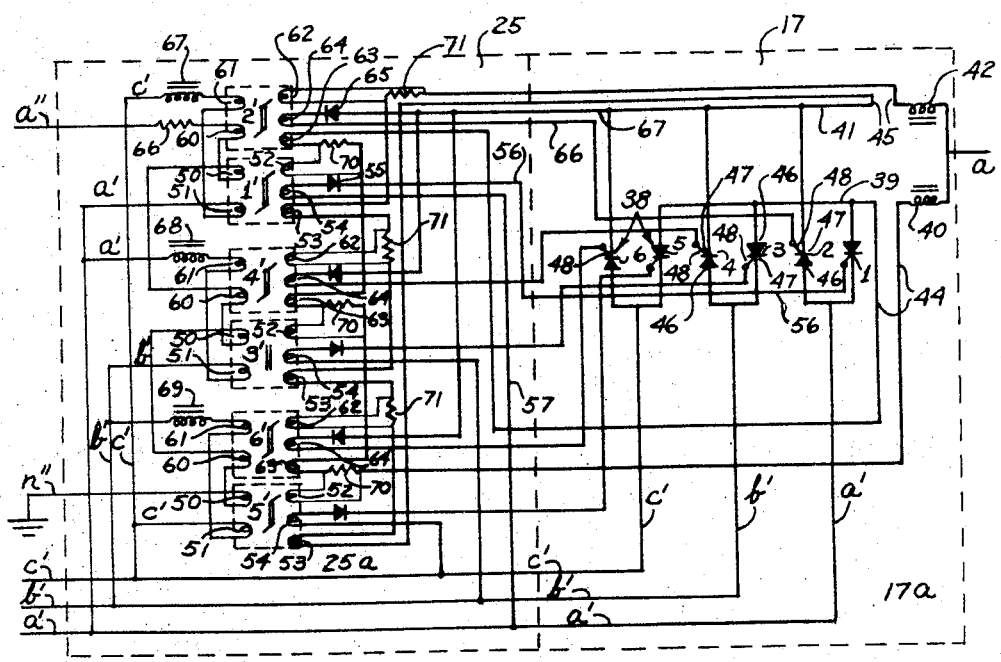
FIGURE 2 is a wiring diagram illustrating a preferred form of static frequency changer and a preferred form of pulse generator for use in the system shown in FIGURE 1.

Successful operation of the system depends on the static frequency changer 17 and the pulse generator 25. Circuit diagrams of these devices are shown in FIGURE 2. The static frequency changer 17 is shown in the right hand portion of FIGURE 2 and preferably is of the "cycloconverter" type. Cycloconverters have the ability to convert electric power of one frequency to power of another frequency with the flow of energy taking place in either direction as required. This is accomplished by means of electronic switching devices. In the past, the switching devices have ordinarily consisted of thyratrons, ignitrons, mercury arc rectifiers and the like. While the circuits of the cycloconverter preferably employed in the present application are of the same general character as the prior art, solid state devices are preferably used as the electronic switching devices. These solid state devices may be transistors coupled with rectifiers but preferably are controlled rectifiers. These are current-controlled electronic switching and rectifying devices.

As shown in FIGURE 2, the static frequency changer 17 is made up of as many sections as there are phases of the slip frequency supply. In the present embodiment there are three sections 17a, 17b and 17c, for phases $a$, $b$ and $c$, respectively, of the slip frequency supply. The sections are identical in all material respects; for this reason only section 17a is described and shown in detail herein. Section 17a preferably comprises six substantially identical controlled silicon rectifiers 38; the individual rectifiers are identified by numerals 1, 2, 3, 4, 5 and 6. The rectifiers are connected in pairs, one pair for each phase of the high frequency supply, with the rectifiers in each pair connected back to back; i.e., arranged for conduction in opposite directions. Rectifiers 1 and 2 are connected to phase $a'$, rectifiers 3 and 4 are connected to phase $b'$, and rectifiers 5 and 6 are connected to the phase $c'$ of the high frequency line to the stator 21 of exciter 18. The even numbered rectifiers are referred to hereinafter as "positive" rectifiers because they conduct when the slip frequency current is positive while, conversely, the odd numbered rectifiers are referred to as "negative" rectifiers. The negative rectifiers 1, 3 and 5 are connected to conductor 39 and through a choke 40 to phase $a$ of the slip frequency supply leads to the rotating field 12 of generator 11. The positive rectifiers 2, 4 and 6 are connected to line 41 and through choke 42 to the same phase. Chokes 40 and 42 are shown as separate elements, but in effect they constitute a center tapped choke. Conductors 44 in the negative rectifier lead and conductors 45 in the positive rectifier lead extend to the pulse generator 25. The connections to the pulse generator are series connections which are explained below.

In the arrangement shown, there are six controlled rectifiers for each of the three phases of the generator slip frequency supply. It is, therefore, a half wave device; the chokes 40 and 42 smooth the somewhat jagged wave form that is produced. It is evident that a full wave device embodying thirty-six controlled rectifiers or other electronic switching devices could be employed with a three phase generator and a three phase exciter and that other numbers of controlled switching devices will be appropriate to generators and exciters having different numbers of phases. For example, it may be desirable to utilize 6 or 12 phase exciters to obtain better wave forms in the slip frequency. Also, as power is increased, further division of the power requirements between a greater number of controlled rectifiers may be desirable. Modifications of this sort are contemplated by the present invention.

The controlled silicon rectifiers are PNPN semiconductors each having an anode 46, a cathode 47 and a gate 48. The rectifiers are normally non-conducting. Avalanche breakdown of the center junction is achieved by applying a signal to the gate, a very brief current pulse of 10 milliamperes at 1½ volts gate-to-cathode being sufficent. The amplitude of the current pulses is not critical, so long as it is sufficient to fire the rectifiers. Breakdown occurs at speeds that are almost instantaneous; after breakdown the voltage across the rectifiers is very low. An extremely small amount of power applied at the gate makes it possible to control the switching action of the rectifiers at a very high rate of speed. When a rectifier is fired by applying appropriate current to the gate, the rectifier becomes conductive and continues to conduct until the forward voltage is removed; in this respect the device acts much in the manner of a thyratron. It can be made conductive during any part of the positive half cycle of the anode to cathode voltage and will remain conductive throughout the remainder of the positive half cycle or until it is turned off by the firing of another rectifier in the frequency changer. Thus, by applying appropriate signal currents at the correct times to the gates 48 of each of the controlled rectifiers, the static frequency changer can be caused to convert the high frequency current supplied by the exciter to the slip frequency current required by the generator with transfer of power in either direction and at any power factor.

The required signal currents are supplied in the form of pulses by the pulse generator 25. The pulse generator is composed of three sections, 25a, 25b and 25c associated with sections 17a, 17b, and 17c, respectively, of the frequency changer. Only section 25a is illustrated in detail inasmuch as the other sections are substantially identical.

According to the present invention signal pulses are supplied to the gates 48 of the several controlled rectifiers at the correct instants required by the demands of the apparatus by means of magnetic core devices 1', 2', 3', 4', 5' and 6' which control the firing of rectifiers 1, 2, 3, 4, 5 and 6, respectively. Each magnetic core device preferably takes the form of a saturable pulse transformer having a toroidal core of square loop material, and the devices are arranged in pairs corresponding to the arrangement of the pairs of rectifiers in the static frequency changer. The magnetic core devices are substantially identical, but receive input signals from different phases of the high frequency supply and of the slip frequency generator. The core devices 1' and 2' for controlling the rectifiers 1 and 2 are described in detail herein, and the same reference characters are applied to corresponding parts of cores 3' and 5', and 4' and 6', respectively.

Each core is provided with five windings. On core 1 these are input windings 50, 51, 52 and 53 and output winding 54. On core 2, the input windings are indicated at 60, 61, 62 and 63 and the output winding at 64. The devices are constructed so that the cores are in a state of either negative saturation or positive saturation except when the algebraic sum of the ampere turns in the several input windings is substantially equal to zero. An output pulse is generated in an output winding only when the associated core goes from one state of saturation to the opposite state of saturation. If necessary, a rectifier 55 can be inserted in the output circuit from winding 54 and a rectifier 65 in the corresponding circuit from winding 64 to permit current to flow only when the cores go from negative saturation to positive saturation. This takes place very rapidly so that the firing of the controlled rectifiers by the resultant pulses can be accurately timed. The cores are saturated except for very brief intervals as they pass through zero, the amplitude of the firing pulses is not critical so long as sufficient current is supplied; therefore, accurate control of the firing time does not depend upon control of the degree of saturation of the cores and it is not necessary to match the cores or the windings with any great degree of accuracy. The output of winding 54 on core 1' is connected to the gate-cathode circuit of rectifier 1 by conductors 56 and 57 as shown and the output of the winding 64 on core 2' is connected to the gate-cathode circuit of rectifier 2 by conductors 66 and 67 as shown. The outputs of the windings 54 on cores 3' and 5' are connected to the gate-cathode circuits of rectifiers 3 and 5, respectively; the outputs of the windings 64 on cores 4' and 6' are connected to the gate-cathode circuits of rectifiers 4 and 6, respectively.

The instants at which rectifiers 1 and 2 are fired are determined primarily by the inputs to the windings 50 and 51 of core 1' and 60 and 61 of core 2'. Windings 50 and 60 on all of the cores are connected in series as shown and are connected between phase a" and ground or neutral n" of the slip frequency generator 27. A resistor 66 is incorporated in the circuit to provide a stable current source. Windings 51 and 61 on cores 1 and 2 are also connected in series and are connected across phases a' and c' of the high frequency exciter 18. A choke 67 is incorporated in this circuit. This circuit provides a current through windings 51 and 61 that lags approximately 120° behind the voltage of phase a' which is supplied to rectifiers 1 and 2. The inductance 67 provides a 90° lag, and the additional 30° is obtained by the connection across phases a' and c' as compared to the a' to neutral voltage applied to the rectifiers 1 and 2. It would be possible to use another high frequency phase and eliminate the inductance, but the inductance is desirable in order to provide a constant current source and to minimize the effects of firing the cores on the high frequency supply circuit. Similar circuits are provided for connecting coils 51 and 61 on cores 3' and 4' across phases a' and b' of the high frequency supply and coils 51 and 61 on cores 5' and 6' across phases b' and c' of the high frequency supply. These circuits include inductances 68 and 69, respectively, and provide currents that lag phases b' and c', respectively by 120°. It is to be noted that the input windings on the even numbered cores and the input windings on the odd numbered cores are connected so that the cores in a pair fire 180° apart.

Windings 53 and 63 are provided on the cores to prevent any of the rectifiers of one group from conducting at the same time that any of the rectifiers of the other group are conducting any substantial amount of current. When any rectifier in the positive group is conducting, the windings 53 on cores 1', 3' and 5', which are all connected in series with the output of the positive rectifiers 2, 4 and 6 through conductors 45, are energized, saturating the cores and preventing the generation of a signal pulse in the windings 54. Similarly, when any of the negative rectifiers 1, 3 and 5 are conducting, the windings 63 on cores 2, 4 and 6 are energized through conductors 44, holding all of these cores in saturation and preventing firing of rectifiers 2, 4 and 6. It is to be noted that these signals are determined by the current flow. This is important because in normal operation of the apparatus, the output current and voltage are not in phase because of the reactive nature of the load.

Windings 52 and 62 on cores 1', 3' and 5' and cores 2', 4' and 6', respectively, are connected across shunts 70 and 71 in the current feedback circuits 44 and 45, respectively. These windings slightly shift the zero axis of the cores and thereby shift the firing points of the cores with which they are associated. For example, when the negative group of controlled rectifiers 1, 3 and 5 are conducting, the current passed by the negative group develops voltages across the shunts 70; this supplies currents to the windings 52 on the cores 1', 2' and 3'. These additional ampere turns slightly advance the firing points of the cores in order to compensate for commutating overlap which varies approximately directly with the current. The windings 62 on cores 2', 4' and 6', connected across shunts 71, provide corresponding compensation for the positive group of controlled rectifiers. These windings do not appear to be essential to satisfactory operation, but are desirable.

With this circuit, the three phase high frequency supply from the exciter is converted to phase $a$ of the low or slip frequency supply to the generator field, in response to phase $a''$ of the slip frequency signal. Phases $b$ and $c$ of the slip frequency supply are produced by sections 17$b$ and 17$c$ of the frequency changer 17; these sections are controlled by sections 25$b$ and 25$c$ of the pulse generator which are similar in all material respects to section 25$a$ except that the inputs are provided by phases $b''$ and $c''$ of the slip frequency signal as indicated in the drawing.

It appears from theoretical considerations and from oscilloscope traces that the operation of the circuits is as illustrated in the diagrams constituting FIGURES 3, 4, 5A and 5B. The mode of operation that takes place when the slip frequency signal is zero for a finite period of time is illustrated in FIGURE 3. For this condition the output voltage of the frequency changer should be zero. To obtain zero output voltage with a three phase, half wave circuit as shown with zero slip frequency signal input, the high frequency control signals to the cores must be 90° behind the points of natural commutation P; i.e., 120° behind the high frequency supply to the corresponding controlled rectifiers. This lag is obtained as explained above by the phase connections to windings 51 and 61 and by the inductances 67, 68 and 69. In Figure 4, the voltages of high frequency supply phases $a'$, $b'$ and $c'$ to the rectifiers 1 and 2 are shown; the high frequency signal inputs to the windings 51 and 61 are not separately shown, because input phases $a'$, $b'$ and $c'$ lag one another by 120° and may be considered as also representing the high frequency signal currents. The signal current $a''$ is equal to zero. Under this condition rectifier 2 of the positive group fires when the high frequency signal current in winding 61 on core 2' passes through zero. The high frequency signal current may be considered as coinciding with voltage $b'$, and the shaded portion under the curve $a'$ indicates the low frequency output voltage of rectifier 2.

Inasmuch as the rectifier is working into an inductive load and, as a practical matter, into an apparatus having a substantial back E.M.F., conduction of rectifier 2 continues until rectifier 4 controlling phase $b'$ is fired. Conduction of rectifier 4 like that of rectifier 2 continues until rectifier 6 controlling phase $c'$ is fired. It will be noted that the areas above and below the zero line are equal. Hence, there is no net voltage and no net current furnished to slip frequency supply phase $a$, the peaks being smoothed out by the action of the chokes 40 and 42. The conduction of each rectifier is stopped at the time the next rectifier is fired. This figure assumes that the rectifiers 1, 3 and 5 of the negative group are held non-conducting, the cores 1', 3' and 5' being prevented from firing by current flowing in the windings 53. It is equally reasonable to assume that the rectifiers of the positive group are held non-conductive and the negative rectifiers are fired, or that, because of the nature of the load, no substantial current flows during the portions of the positive half cycles that the rectifiers are conductive, in which case the rectifiers of the positive group and the rectifiers of the negative group would fire alternately. Also, if the load were purely resistive and the power factor 100%, then the rectifiers in the negative group would be fired alternately with the rectifiers in the positive group, again resulting in zero output to the slip frequency supply phase $a$. In any event, no current is transmitted to the slip frequency supply phase $a$. The same action takes place in the other sections of the frequency changer 17 and the pulse generator 25, so that no voltage is supplied to the rotor windings of the main generator.

FIGURE 4 shows the operation when the slip frequency signal is a negative direct voltage for a finite period of time as indicated by the dotted line $a''$. This negative voltage advances the firing of the cores 2, 4 and 6 to a point about 60° after the beginning of each positive half cycle, the periods of conduction of the positive rectifiers 2, 4 and 6 being indicated by the shaded areas as before. The resultant direct voltage is indicated by the solid black line $a$ parallel to the zero axis. In this mode of operation the peaks and valleys are again smoothed out by the chokes; the negative cores 1', 3' and 5' are prevented from firing by the current flowing through windings 53. It will be evident that by increasing or decreasing the value of the D.C. signal $a''$ that the output voltage of phase $a$ can be correspondingly varied. It will also be evident that by applying a signal of opposite sign to the cores through the windings 50 and 60 that the rectifiers in the negative group can be caused to fire through the firing of the cores 1', 3' and 5'. The time of firing of the cores can be advanced as far as the points of natural commutation P, which will provide maximum output. Thus, if the voltage of the slip frequency signal is slowly varied from negative through zero to positive in a cyclic manner at the slip frequency, the output voltage will vary in a corresponding manner. Each section of the frequency changer 25 produces one phase of the desired output in accordance with the signal of one phase of the slip frequency signal.

Inasmuch as the rectifiers are arranged back to back and since there is no direct current link in the static frequency changer, the changer is able to transmit power in either direction and at any power factor. The frequency changer can function even though the instantaneous values of the low frequency current and low frequency voltage are of opposite sign. FIGURES 5A and 5B illustrate the operation of the device at a frequency ratio of three to one and a power factor of about 0.7. The high frequency input phases are indicated by $a'$, $b'$ and $c'$ as before; the slip frequency signal is shown by the dotted line $a''$ while the slip frequency output voltage of phase $a$ is shown by the solid line. This line is smoothed by the chokes 40 and 42. The output of the rectifiers, without smoothing, would be a jagged wave alternately above and below the desired sine wave; the jagged wave is not shown in the drawing in order to avoid confusion in illustration. The resulting lagging current output is shown at $i_a$ in FIGURE 5B. The frequency changer is operating in a mixed rectification and inversion mode in these diagrams. During approximately the first one-eighth of the cycle of output voltage $a$, the frequency changer operates in inversion because the instantaneous values of the low frequency current and low frequency voltage are of opposite sign. Rectification takes place during the balance of the positive half cycle because the instantaneous current and voltage have the same sign. The positive group of controlled rectifiers operate for the positive half cycle of the current but not necessarily for the positive half cycle of the voltage. Only for a purely resistive load would the positive rectifiers be operating during the entire positive half cycle of the voltage. The windings 53 and 63 which saturate the cores when current is flowing through the negative and positive rectifiers, respectively, determine which group of rectifiers will operate and prevent firing of the cores of one group when the rectifiers associated with the cores of the other group are conducting current.

Because the controlled rectifiers turn on almost instantaneously but require a small amount of time to shut off because of the inductance of the synchronous exciter output windings, the windings 52 and 62 are employed to slightly advance the firing points of the cores and thereby to compensate for commutating overlap, and to compensate for the lag in firing that takes place because of the magnetic characteristics of the core material. The additional ampere turns furnished by these coils have the effect of slightly shifting zero axis which shifts the firing point of the cores that are associated with the controlled rectifiers that are conducting. When the positive group 2, 4 and 6 of controlled rectifiers are conducting, the current passed by them develops a voltage across the shunts 71, supplying additional ampere turns to the cores controlling the positive groups.

Similarly, when the negative rectifiers 1, 3 and 5 are conducting, the voltages developed across the shunts 70 supply a current to the windings 52 that shift the firing points of the cores 1', 3' and 5'. Those skilled in the art will appreciate that circuits other than the shunt arrangements shown could be employed for providing the current to these windings. Also, the windings 53 and 63 could be fed from the shunts instead of passing the entire current through the windings.

The diagrams constituting FIGURES 5A and 5B are given only by way of example; similar diagrams for other modes of operation can be constructed by those skilled in the art, the firing points of the magnetic cores being determined by graphic or algebraic addition of the ampere turns supplied to the cores by the several input windings. Similar determinations of output voltage and current wave forms can be made by phasor analysis.

An analysis of the frequency changer and pulse generator by these methods shows that the frequency changer is capable of transferring power in either direction between the high frequency supply and the slip frequency supply and is capable of transmitting both reactive and real power. This also has been demonstrated by tests. Another advantage of this type of static frequency changer is that it is a single conversion device, and, hence, has inherently extremely high efficiency. Because of the high efficiency, dissipation of heat is not a serious problem. The components are sturdy and long-lived; and by multiplying the numbers of controlled rectifiers and magnetic cores employed, the load can be divided among the controlled rectifiers so that any reasonable amount of excitation current can be handled with the transmission of power in either direction.

A modified, and in some respects preferred, system embodying the present invention is illustrated in FIGURES 6 and 7 of the drawings. In this system the main generator 11' is an induction machine similar in all material respects to the generator 11 previously described and having exciting windings 12' and output windings 14' that supply the buses 10'. A synchronous condenser 15' may be connected to the output buses as before. As in the previous modification, the exciting windings 12' of the main generator rotor are supplied through slip rings with slip frequency excitation current having phases $a$, $b$ and $c$, by means of a static frequency changer 17'. The requirements and characteristics of the excitation current are the same as described in connection with the previous modification. The shaft S' carries, in addition to the main generator, an exciter generator 18'. This is a synchronous machine; but this machine has the same number of poles as the main generator; its "high frequency" output, therefore, is at shaft frequency. Exciter 18' may be excited by a permanent magnet generator 22', through an appropriate rectifier and control 23', as in the previous modification. In this modification of the invention, there is no slip frequency generator. Instead, the proper signals for the frequency changer 17' are derived in the pulse generator 25' from the shaft frequency and from a three phase constant reference frequency signal having a frequency equal to the desired output frequency of the main generator. The reference frequency phases are indicated at $a''$, $b''$ and $c''$. The required constant reference frequency may be produced by any convenient source 28'.

The frequency changer 17' is similar in all material respects to the frequency changer 17 previously described, and in FIGURE 7 the same reference characters have been applied to the frequency changer 17' as used for corresponding components in the frequency changer 17. The pulse generator 25' is also essentially the same as the pulse generator 25 previously described insofar as the magnetic cores and the windings thereon are concerned, and the same reference characters usd in FIGURE 2 have been used in FIGURE 7 on the corresponding components of pulse generator 25'. It is to be noted, however, that in this form of the invention the windings 50 and 60 on cores 1' and 2' in section 25a' of the pulse generator are supplied by phase $a''$ of the reference frequency source; windings 50 and 60 of cores 3' and 4' are supplied by phase $b''$; and windings 50 and 60 on cores 5' and 6' are supplied by phase $c''$ of the reference frequency source. In sections 25b' and 25c' of the pulse generator, the relationship between the phases is changed in order to provide phases $b$ and $c$ of the slip frequency supply. Thus, in sections 25b' and 25c' the shaft frequency supply to the several cores, as diagramatically indicated, is the same as in section 25c', but in section 25b' windings 50 and 60 on cores 1' and 2' are supplied by phase $b''$ of the reference frequency; windings 50 and 60 on cores 3' and 4' are supplied by phase $C''$ of the reference frequency; and windings 50 and 60 on cores 5' and 6' are supplied with phase $a''$ of the reference frequency. In section 25c windings 50 and 60 on cores 1' and 2' are supplied by phase $c''$, windings 50 and 60 on cores 3' and 4' are supplied by phase $a''$; and windings 50 and 60 on cores 5' and 6' are supplied by phase $b''$ of the reference frequency. This provides the proper phase relationship in the slip frequecy supply phases $a$, $b$ and $c$.

Figure 8A:
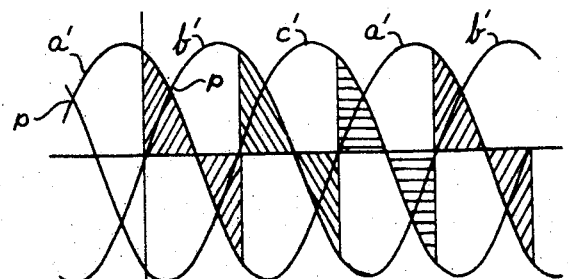
Figure 8B:
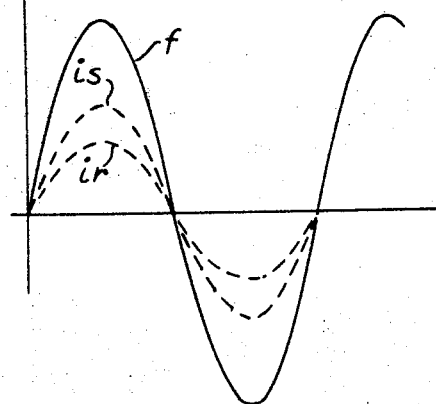

Three modes of operation of the system shown in FIGURES 6 and 7 are illustrated diagrammatically in FIGS. 8, 9 and 10. In FIGURE 8A, curves $a'$, $b'$ and $c'$ indicate the high frequency (i.e., shaft frequency) input to the rectifiers 1 and 2, and the shaded portions of the curve indicate the low frequency output voltage, the net effect of which is zero as in FIGURE 3. Zero output is obtained when shaft frequency is precisely in phase with the reference frequency. In FIGURE 8B, curve $i_r$ indicates the reference frequency derived from the constant frequency source and curve $i_s$ indicates the shaft frequency minus 120°, these being the input frequencies to windings 50, 51, 60 and 61 on cores 1' and 2' of pulse generator 25a'. Curve $f$ shows the resultant ampere turns on the cores. This curve crosses zero at substantially the same time as the flux saturation curve of the cores. Assuming the cores of the positive group to be firing, core 2 will fire and rectifier 2 conduct when curve $f$ crosses through zero in the negative to positive direction. This occurs 60° after the points of natural commutation P, and as explained in connection with FIGURE 3, produces the net zero voltage and current output indicated in FIGURE 8A. Only one phase of the input currents is indicated in FIGURE 8B for convenience of illustration.

Figure 9A:
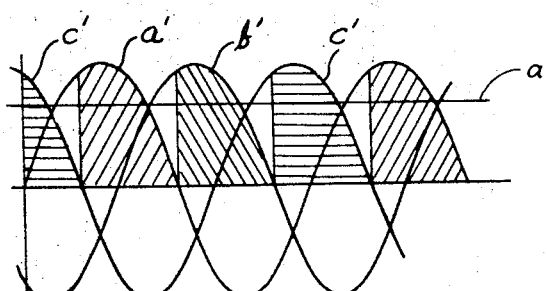
Figure 9B:
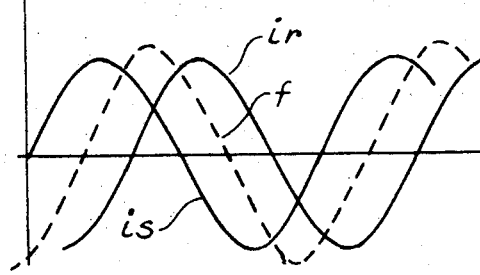

FIGURES 9A and 9B illustrate the mode of operation when the apparatus is operating at synchronous speed, but the reference frequency signal is advanced about 120° with respect to the supply voltage. As shown in FIGURE 9A, this causes the rectifiers to become conductive after about 60° in each positive half cycle, thus producing the resultant D.C. voltage indicated by line $a$, the shaded areas again indicating the voltage on the output side of the rectifiers.

FIGURE 9B shows one phase of the firing circuits. Curve $i_r$ indicates the reference current; curve $i_s$ indicates the shaft frequency minus 120°; and curve $f$ represents the total ampere turns on the core. As before, the cores fire and the rectifiers are made conductive when curve $f$ passes through zero in the negative to positive direction. As in FIGURE 8B, only one phase of the currents in the windings on the core are shown.

FIGURE 10A illustrates one quarter of a cycle showing the operation at a non-synchronous speed. In this figure, curves $a'$, $b'$ and $c'$ indicate the shaft frequency inputs as before, while curve $a$ indicates one-quarter cycle of the slip frequency output. The shaded areas under the curves show the output voltages on the rectifiers from which the curve $a$ is synthesized.

FIGURE 10B illustrates the firing currents. Again $i_r$ is the constant reference frequency, $i_s$ is the shaft frequency minus 120°, and curve $f$ indicates the total ampere turns on the core. This is for the circuits controlling phase $a'$ only of the shaft frequency input to the frequency changer. It will be noted that the shaft frequency is slightly greater than the reference frequency and that the firing of the cores synthesizes a frequency that is the difference between the shaft frequency and reference frequency, this being the slip frequency. Mathematical and phasor analysis, as well as tests of the apparatus, demonstrate that the frequency changer, when controlled by the pulse generator of this modification, is able to transmit both real and reactive power in either direction. In this form of the invention, the speed range is somewhat less than in the previous form, but this form is advantageous because the slip frequency generator is eliminated.

From the foregoing description of preferred forms of the invention, it will be evident that we have provided a system for generating alternating current of substantially constant frequency regardless of comparatively wide variations in the speed of the prime mover that drives the machine. The frequency of the output of the system is always identical with the reference frequency and, therefore, the output frequency can be maintained very accurately. With systems made according to the modification disclosed in FIGURES 1 and 2 of the drawings, speed ratios of maximum to minimum speeds of the drive shaft of 3 to 1 can be handled readily while maintaining the output frequency substantially constant. Even greater speed ratios can be tolerated if the frequency of the synchronous exciter is increased or the number of poles in the synchronous exciter is increased. With the apparatus shown in the second modification where the synchronous exciter contains the same number of poles as the main alternator, shaft speed ranges of 2 to 1 can be accommodated readily. Inasmuch as the frequency changer is capable of transmitting both real and reactive power in either direction, efficient operation of the main induction machine can be obtained; at speeds above synchronous speeds the exciter acts as a motor, putting power back into the shaft, thus improving the efficiency of the system as compared to systems where the power is wasted. The frequency changer is required to handle only the excitation currents, and therefore it is not unduly loaded. The frequency changer and pulse generator are made up of small, rugged components having no moving parts, making the system ideally suited for use in aircraft and missiles.

The apparatus can be utilized with conventional controls and protective devices. In the first modification illustrated, the slip frequency generator embodies a commutator; but this is required to handle no substantial amounts of power, so commutating problems are not serious. In the second modification, no commutator is required. A slip ring main generator is illustrated, but it is evident that brushless machines of various types known in the art could be utilized if desired. For example, the output and exciting windings of the exciter 18 could be mounted on the rotor and stator, respectively, and the pulse generator and the static frequency changer mounted on the shaft, thus eliminating slip rings from the exciter and the main generator.

Various changes and modifications can be made in the preferred form of the invention disclosed herein without departing from the spirit and scope thereof. The essential characteristics of the invention are defined in the appended claims.

We claim:

1. Apparatus for generating alternating current of substantially constant frequency at varying shaft speeds comprising a main induction generator having a stator and a rotor, one of said elements having polyphase exciting windings and the other having output windings, said rotor being driven by a variable speed shaft, a synchronous exciter connected to said shaft, a static frequency changer connected between said synchronous exciter and said exciting windings, said frequency changer embodying pairs of current-controlled electronic switching and rectifying devices with the devices in a pair arranged back to back, and a pulse generator for controlling the firing of said rectifiers to change the frequency of the output of said synchronous exciter to slip frequency with interchange of both real and reactive power in either direction between said synchronous exciter and said exciting windings.

2. Apparatus for generating alternating current of substantially constant frequency at varying shaft speeds comprising a main induction generator having a stator and a rotor, one of said elements having polyphase exciting windings and the other having output windings, said rotor being driven by a shaft, said shaft being adapted to be driven throughout a speed range extending from substantially below synchronous speed to substantially above synchronous speed, a synchronous condenser connected to the output of said main generator, a synchronous exciter connected to said shaft, a static frequency changer connected between said synchronous exciter and said exciting windings, said frequency changer embodying pairs of current-controlled electronic switching and rectifying devices with the devices in a pair arranged back to back, and a pulse generator for controlling the firing of said rectifiers to change the frequency of the output of said synchronous exciter to slip frequency with interchange of both real and reactive power in either direction between said synchronous exciter and said exciting windings.

3. Apparatus for generating alternating current of substantially constant frequency at varying shaft speeds comprising a main induction generator having a stator and a rotor, one of said elements having polyphase exciting windings and the other having output windings, said rotor being driven by a variable speed shaft, a constant frequency source, a synchronous exciter connected to said shaft, a static frequency changer connected between said synchronous exciter and said exciting windings, said frequency changer embodying pairs of current-controlled electronic switching and rectifying devices with the rectifiers in a pair arranged back to back, and a pulse generator for controlling the firing of said rectifiers to change the frequency of the output of said synchronous exciter to slip frequency with interchange of both real and reactive power in either direction between said synchronous exciter and said exciting windings, said pulse generator being controlled by currents derived from said synchronous exciter and from said constant frequency source.

4. Apparatus according to claim 3 wherein the current derived from the constant frequency source is at the frequency of the constant frequency source.

5. Apparatus according to claim 3 wherein a second frequency changer is provided to derive slip frequency from said constant second frequency source and the output of said frequency changer is utilized in the control of said pulse generator.

6. Apparatus according to claim 5 wherein the frequency changer is a commutator frequency changer driven by said shaft.

7. Apparatus for generating alternating current of substantially constant frequency at varying shaft speeds comprising a main induction generator having a stator and a rotor, one of said elements having polyphase exciting windings and the other having output windings, said rotor being driven by a shaft, said shaft being adapted to be driven throughout a speed range extending from substantially below synchronous spede to substantially above synchronous speed, a synchronous condenser connected to the output of said main generator, a constant frequency source, a synchronous exciter connected to said shaft, a static frequency changer connected between said synchronous exciter and said exciting windings, said frequency changer embodying pairs of current-controlled electronic switching and rectifying devices with the rectifiers in a pair arranged back to back, and a pulse generator for controlling the firing of said rectifiers to change the frequency of the output of said synchronous exciter to slip frequency with interchange of both real and reactive power in either direction between said synchronous exciter and said exciting windings, said pulse generator comprising a saturable core transformer for each of said electronic switching and rectifying devices, said transformers being controlled by currents derived from said synchronous exciter and from said constant frequency source to produce firing pulses for said electronic switching and rectifying devices.

8. Apparatus for generating alternating current of substantially constant frequency at varying shaft speeds comprising a main induction generator having a stator and a rotor, one of said elements having polyphase exciting windings and the other having output windings, said rotor being driven by a shaft, said shaft being adapted to be driven throughout a speed range extending from substantially below synchronous speed to substantially above synchronous speed, a synchronous exciter connected to said shaft, a static frequency changer connected between said changer comprising a plurality of pairs of controlled rectifiers for each phase of said exciter with the rectifiers in a pair arranged back to back, and a pulse generator controlled by a current derived from the output of said exciter and a current derived from a constant reference freqency for controlling the firing of said rectifiers to change the output of said synchronous exciter to slip frequency with interchange of both real and reactive power in either direction between said synchronous exciter and said exciting windings.

9. Apparatus for generating alternating current of substantially constant frequency at varying shaft speeds comprising a main induction generator having a stator and a rotor, one of said elements having polyphase exciting windings and the other having output windings, said rotor being driven by a shaft, said shaft being adapted to be driven throughout a speed range extending from substantially below synchronous speed to substantaily above synchronous speed, a synchronous exciter having the same number of poles as said main generator connected to said shaft, a static frequency changer connected between said synchronous exciter and said exciting windings, said frequency changer comprising a plurality of pairs of controlled rectifiers, there being one pair for each phase of said exciter with the rectifiers in a pair arranged back to back, and a pulse generator controlled by a current derived from the output of said exciter and a constant frequency current having the desired output frequency for controlling the firing of said rectifiers to change the output of said synchronous exciter to slip frequency with interchange of both real and reactive power in either direction between said synchronous exciter and said exciting windings.

10. Apparatus for generating alternating current of substantially constant frequency at varying shaft speeds comprising a main induction generator having a stator and a rotor, one of said elements having polyphase exciting windings and the other having output windings, said rotor being driven by a shaft, said shaft being adapted to be driven throughout a speed range extending substantially below synchronous speed to substantially above synchronous speed, a synchronous exciter having a greater number of poles than said main generator connected to said shaft, a static frequency changer connected between said synchronous exciter and said exciting windings, said frequency changer comprising a plurality of sections, one for each phase of said exciting windings, each section embodying a pair of current-controlled electronic switching and rectifying devices, there being one pair for each phase of said exciter with the devices in a pair arranged back to back, and a pulse generator controlled by a current derived from the output of said exciter and a current derived from a constant reference frequency for controlling the firing of said electronic switching and rectifying devices to change the high frequency output of said synchronous exciter to slip frequency with interchange of both real and reactive power in either direction between said synchronous exciter and said exciting windings.

11. Apparatus for generating alternating current of substantially constant frequency at varying shaft speeds comprising a main induction generator having a stator and a rotor, one of said elements having polyphase exciting windings and the other having output windings, said rotor being driven by a variable speed shaft, a synchronous exciter connected to said shaft, a static frequency changer connected between said synchronous exciter and said exciting windings, said frequency changer comprising a plurality of sections, one for each phase of said exciting windings, each section embodying a pair of current-controlled electronic switching and rectifying devices for each phase of said exciter with the devices in a pair arranged back to back, and a pulse generator comprising a saturable core transformer for each of said electronic switching and rectifying devices, each such transformer being controlled by a current derived from the output of said exciter and a current derived from a constant reference frequency for controlling the firing of said electronic switching and rectifying devices to change the high frequency output of said synchronous exciter to slip frequency with interchange of both real and reactive power in either direction between said synchronous exciter and said exciting windings.

12. In an apparatus for generating alternating current of substantially constant frequency at varying shaft speeds comprising a main induction generator having a stator and a rotor, one of said elements having polyphase exciting windings and the other having output windings, said rotor being driven by a variable speed shaft, and a synchronous exciter connected to said shaft, the improvement comprising a static frequency changer connected between said synchronous exciter and said exciting windings for supplying slip frequency excitation to said exciting windings, said frequency changer comprising a plurality of sections, one for each phase of said exciting windings, each section embodying a pair of controlled rectifiers for each phase of said exciter with the rectifiers in each pair arranged back to back, all of the rectifiers that conduct in one direction in section being connected together in a group on the slip frequency side of the frequency changer and all of the rectifiers that conduct in the opposite direction being connected together in another group, said groups of rectifiers being connected to the ends of a center-tapped choke on the slip frequency side of the frequency changer and the center tap of the choke being connected to one of the phases of the exciting windings, and a pulse generator controlled by a current derived from the output of said exciter and a current derived from a constant reference frequency for controlling the firing of said rectifiers to change the high frequency output of said synchronous exciter to slip frequency with interchange of both real and reactive power in either direction between said synchronous exciter and said exciting windings.

13. In an apparatus for generating alternating current of substantially constant frequency at varying shaft speeds comprising a main induction generator having a stator and a rotor, one of said elements having polyphase exciting windings and the other having output windings, said rotor being driven by a shaft, said shaft being adapted to be driven throughout a speed range extending substantially below synchronous speed to substantially above synchronous speed, and a synchronous exciter connected to said shaft, the improvement comprising a static frequency changer connected between said synchronous exciter and said exciting windings for supplying slip frequency excitation to said exciting windings, said frequency changer comprising a plurality of sections, one for each phase of said exciting windings, each section embodying a pair of controlled rectifiers for each phase of said exciter with the rectifiers in each pair arranged back to back, all of the rectifiers that conduct in one direction in section being connected together in a group on the slip frequency side of the frequency changer and all of the rectifiers that conduct in the opposite direction being connected together in another group, said groups of rectifiers being connected to the ends of a center-tapped choke on the slip frequency side of the frequency changer and the center tap of the choke being connected to one of the phases of the exciting windings, and a pulse generator controlled by a current derived from the output of said exciter and a current derived from a constant reference frequency for controlling the firing of said rectifiers to change the high frequency output of said synchronous exciter to slip frequency with interchange of both real and reactive power in either direction between said synchronous exciter and said exciting windings, said pulse generator comprising a saturable core transformer for each controlled rectifier in the static frequency changer, each transformer having an input winding carrying a current derived from the output of said synchronous exciter and an input winding carrying a current derived from a constant frequency source, and an output winding for supplying a firing pulse to one of said rectifiers.

14. In an apparatus for generating alternating current of substantially constant frequency at varying shaft speeds comprising a main induction generator having a stator and a rotor, one of said elements having polyphase exciting windings and the other having output windings, said rotor being driven by a shaft, said shaft being adapted to be driven throughout a speed range extending from substantially below synchronous speed to substantially above synchronous speed, and a synchronous exciter driven by said shaft, the improvement comprising a static frequency changer connected between said synchronous exciter and said exciting windings, said frequency changer embodying pairs of current controlled electronic switching and rectifying devices with the switching devices in a pair arranged back to back, and a pulse generator for controlling the firing of said switching devices to change the frequency of the output of said synchronous exciter to slip frequency with interchange of both real and reactive power in either direction between said synchronous exciter and said exciting windings, said pulse generator comprising a saturable core transformer for each switching device in the static frequency changer, each transformer having an input winding carrying a current derived from the output of said synchronous exciter and an input winding carrying a current derived from a constant frequency source, and an output winding for supplying a firing pulse to one of said switching devices.

15. In an apparatus for generating alternating current of substantially constant frequency at varying shaft speeds comprising a main induction generator having a stator and a rotor, one of said elements having polyphase exciting windings and the other having output windings, said rotor being driven by a variable speed shaft, and a synchronous exciter driven by said shaft, the improvement comprising a static frequency changer connected between said synchronous exciter and said exciting windings, said frequency changer embodying a plurality of current controlled electronic switching and rectifying devices, and a pulse generator for controlling the firing of said switching devices to change the frequency of the output of said synchronous exciter to slip frequency with interchange of both real and reactive power in either direction between said synchronous exciter and said exciting windings, said pulse generator comprising a saturable core transformer for each switching device in the static frequency changer, each transformer having an input winding carrying a current derived from the output of said synchronous exciter and an input winding carrying a current derived from a constant frequency source, and an output winding for supplying a firing pulse to one of said switching devices.

16. Apparatus for generating alternating current of substantialy constant frequency at varying shaft speeds comprising a main induction generator having a stator and a rotor, one of said elements having polyphase exciting windings and the other having output windings, said rotor being driven by a shaft, said shaft being adapted to be driven throughout a speed range extending from substantially below synchronous speed to substantially above synchronous speed, a synchronous exciter driven by said shaft, a static frequency changer connected between said synchronous exciter and said exciting windings, said frequency changer embodying pairs of current controlled electronic switching and rectifying devices with the switching devices in a pair back to back, and a pulse generator for controlling the firing of said switching devices to change the frequency of the output of said synchronous exciter to slip frequency with interchange of both real and reactive power in either direction between said synchronous exciter and said exciting windings, said pulse generator comprising a plurality of saturable core transformers, one for each switching device in the static frequency changer, each transformer having an input winding carrying a current derived from the output of said synchronous exciter, an input winding carrying a current derived from a constant frequency source, an input winding carrying a current derived from the output of a switching device that conducts oppositely from the switching device that is controlled by the particular transformer, and an output winding for supplying a firing pulse to one of the controlled rectifiers.

17. Apparatus for generating alternating current of substantially constant frequency at varying shaft speeds comprising a main induction generator having a stator and a rotor, one of said elements having polyphase exciting windings and the other having output windings, said rotor being driven by a shaft, said shaft being adapted to be driven throughout a speed range extending from substantially below synchronous speed to substantially above synchronous speed, a synchronous exciter driven by said shaft, a static frequency changer connected between said synchronous exciter and said exciting windings, said frequency changer embodying pairs of current controlled electronic switching and rectifying devices with the switching devices in a pair arranged back to back, and a pulse generator for controlling the firing of said switching devices to change the frequency of the output of said synchronous exciter to slip frequency with interchange of both real and reactive power in either direction between said synchronous exciter and said exciting windings, said pulse generator comprising a plurality of saturable core transformers, one for each switching device in the static frequency changer, each transformer having an input winding carrying a current derived from the output of said synchronous exciter, an input winding carrying a current derived from a constant frequency source, an input winding carrying a current derived from the output of a switching device that conducts oppositely from the switching device that is controlled by the particular transformer, a compensating input winding for advancing the firing of the transformer, and an output winding for supplying a firing pulse to one of the controlled rectifiers.

18. In an apparatus for generating alternating current of substantially constant frequency at varying shaft speeds comprising a main induction generator having a stator and a rotor, one of said elements having polyphase exciting windings and the other having output windings, said rotor being driven by a shaft, said shaft being adapted to be driven throughout a speed range extending from substantially below synchronous speed to substantially above synchronous speed, and a synchronous exciter driven by said shaft and having the same number of poles as said main generator, the improvement comprising a static frequency changer connected between said synchronous exciter and said exciting windings, said frequency changer embodying pairs of current controlled electronic switching and rectifying devices with the switching devices in a pair arranged back to back, and a pulse generator for controlling the firing of said switching devices to change the frequency of the output of said synchronous exciter to slip frequency with interchange of both real and reactive power in either direction between said synchronous exciter and said exciting windings, said pulse generator comprising a plurality of saturable core transformers, one of each switching device in the static frequency changer, each transformer having an input winding carrying a shaft frequency current derived from the output of said synchronous exciter, an input winding carrying a current having frequency equal to the desired output frequency, and an output winding for supplying a firing pulse to one of the controlled rectifiers.

19. In an apparatus for generating alternating current of substantially constant frequency at varying shaft speeds comprising a main induction generator having a stator and a rotor, one of said elements having polyphase exciting windings and the other having output windings, said rotor being driven by a shaft, said shaft being adapted to be driven throughout a speed range extending from substantially below synchronous speed to substantially above synchronous speed, and a synchronous exciter driven by said shaft and having the same number of poles as said main generator, the improvement comprising a static frequency changer connected between said synchronous exciter and said exciting windings, said frequency changer embodying pairs of controlled rectifiers with the rectifiers in a pair arranged back to back, and a pulse generator for controlling the firing of said rectifiers to change the frequency of the output of said synchronous exciter to slip frequency with interchange of both real and active power in either direction between said synchronous exciter and said exciting windings, said pulse generator comprising a plurality of saturable core transformers, one for each rectifier in the static frequency changer, each transformer having an input winding carrying a shaft frequency current derived from the output of said synchronous exciter, an input winding carrying a current having frequency equal to the desired output frequency, an input winding for preventing the firing of the transformer while the other rectifier in the pair to one of which the transformer is connected is conducting, and an output winding for supplying a firing pulse to one of the the controlled rectifiers.

20. A static frequency changer comprising pairs of current controlled electronic switching and rectifying devices with the switching devices in a pair arranged back to back, and a pulse generator for controlling the firing of said switching devices to change the frequency of the input to said frequency changer to a desired output frequency with interchange of both real and reactive power in either direction, said pulse generator comprising a saturable core transformer for each switching device in the static frequency changer, each transformer having an input winding for controlling the firing of the transformer and an output winding for supplying a firing pulse to one of said switching devices.

21. A static frequency changer comprising pairs of current controlled solid state electronic switching and rectifying devices with the switching devices in a pair arranged back to back, and a pulse generator for controlling the firing of said switching devices to change the frequency of the input to said frequency changer to a frequency that is equal to the difference between two frequencies with interchange of both real and reactive power in either direction, said pulse generator comprising a plurality of saturable core transformers, one for each switching device in the static frequency changer, each transformer having an input winding carrying a current of one of said two frequencies, an input winding carrying a current of the other of said two frequencies, and an output winding for supplying a firing pulse to one of the controlled rectifiers.

22. A static frequency changer comprising pairs of current controlled solid state electronic switching and rectifying devices with the switching devices in a pair arranged back to back, and a pulse generator for controlling the firing of said switching devices to change the frequency of the input to said frequency changer to a frequency that is equal to the difference between two frequencies with interchange of both real and reactive power in either direction, said pulse generator comprising a plurality of saturable core transformers, one for each switching device in the static frequency changer, each transformer having an input winding carrying a current of one of said two frequencies, an input winding carrying a current of the other of said two frequencies, an input winding carrying a current derived from the output of a switching device that conducts oppositely from the switching device that is controlled by the particular transformer, and an output winding for supplying a firing pulse to one of the controlled rectifiers.

23. A static frequency changer comprising pairs of current controlled solid state electronic switching and rectifying devices with the switching devices in a pair arranged back to back, and a pulse generator for controlling the firing of said switching devices to change the frequency of the input to said frequency changer to a frequency that is equal to the difference between two frequencies with interchange of both real and reactive power in either direction, said pulse generator comprising a plurality of saturable core transformers, one for each switching device in the static frequency changer, each transformer having an input winding carrying a current of one of said two frequencies, an input winding carrying a current of the other of said two frequencies, an input winding carrying a current derived from the output of a switching device that conducts oppositely from the switching device that is controlled by the particular transformer, a compensating input winding for advancing the firing of the transformer, and an output winding for supplying a firing pulse to one of the controlled rectifiers.

24. A static frequency changer connected between a polyphase input and a polyphase output, said frequency changer comprising a plurality of sections, one for each phase of said output, each section embodying a pair of controlled rectifiers for each phase of said input with the rectifiers in each pair arranged back to back, all of the rectifiers that conduct in one direction in a section being connected together in a group on output side of the frequency changer and all of the rectifiers that conduct in the opposite direction being connected together in another group, and a pulse generator for controlling the firing of said rectifiers to change the input frequency to a desired output frequency with interchange of both real and reactive power in either direction between said input and said output, said pulse generator comprising a saturable core transformer for each switching device in the static frequency changer, each transformer having an input winding, and an output winding for supplying a firing pulse to one of said rectifiers.

25. A static frequency changer connected between a polyphase input and a polyphase output, said frequency changer comprising a plurality of setcions, one for each phase of said output, each section embodying a pair of controlled rectifiers for each phase of said input with the rectifiers in each pair arranged back to back, all of the rectifiers that conduct in one direction in a section being connected together in a group on output side of the frequency changer and all of the rectifiers that conduct in the opposite direction being connected together in another group, said groups of rectifiers being connected to the ends of a center-tapped choke on the output side of the frequency changer and the center tap of the choke being connected to one of the phases of said output, and a pulse generator for controlling the firing of said rectifiers to change the input frequency to a desired output frequency with interchange of both real and reactive power in either direction between said input and said output, said pulse generator comprising a saturable core transformer for each switching device in the static frequency changer, each transformer having an input winding carrying a current derived from said input and an input winding carrying a current derived from a constant frequency source, and an output winding for supplying a firing pulse to one of said rectifiers.

References Cited in the file of this patent
UNITED STATES PATENTS

| | | |
|---|---|---|
| 2,546,783 | Roemke | Mar. 27, 1951 |
| 2,659,044 | MacNeil | Nov. 10, 1953 |
| 2,831,156 | Mathews et al. | Apr. 15, 1958 |
| 2,854,617 | Johnson | Sept. 30, 1958 |

---

UNITED STATES PATENT OFFICE
CERTIFICATE OF CORRECTION

Patent No. 2,995,696                                              August 8, 1961

Lawrence J. Stratton et al.

It is hereby certified that error appears in the above numbered patent requiring correction and that the said Letters Patent should read as corrected below.

Column 2, line 40, for "The" read -- These --; column 6, line 19, before "winding" strike out "the"; column 10, line 13, for "geenrator" read -- generator --; line 33, for "C"" read -- $c''$ --, in italics; column 12, line 70, strike out "second"; line 71, before "frequency" insert -- second --; column 17, line 25, for "of" read -- for --; line 49, for "active" read -- reactive --.

Signed and sealed this 6th day of February 1962.

(SEAL)
Attest:

ERNEST W. SWIDER                                        DAVID L. LADD
Attesting Officer                                             Commissioner of Patents